Patented Nov. 16, 1943

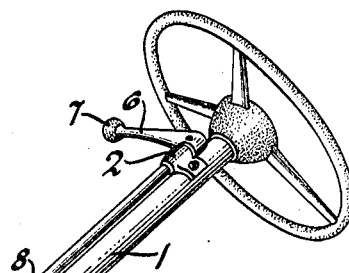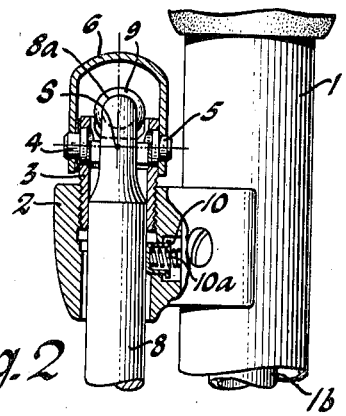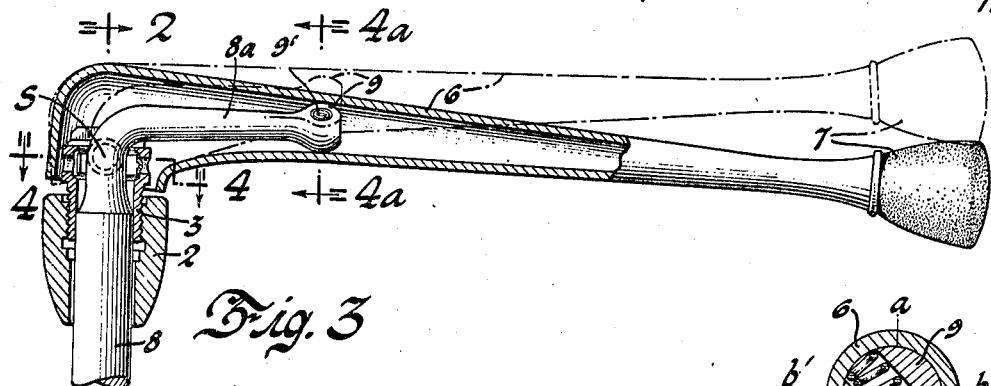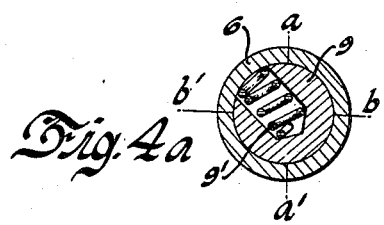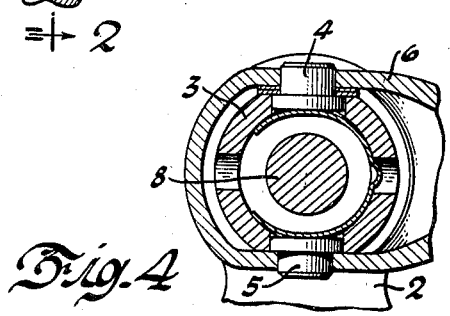

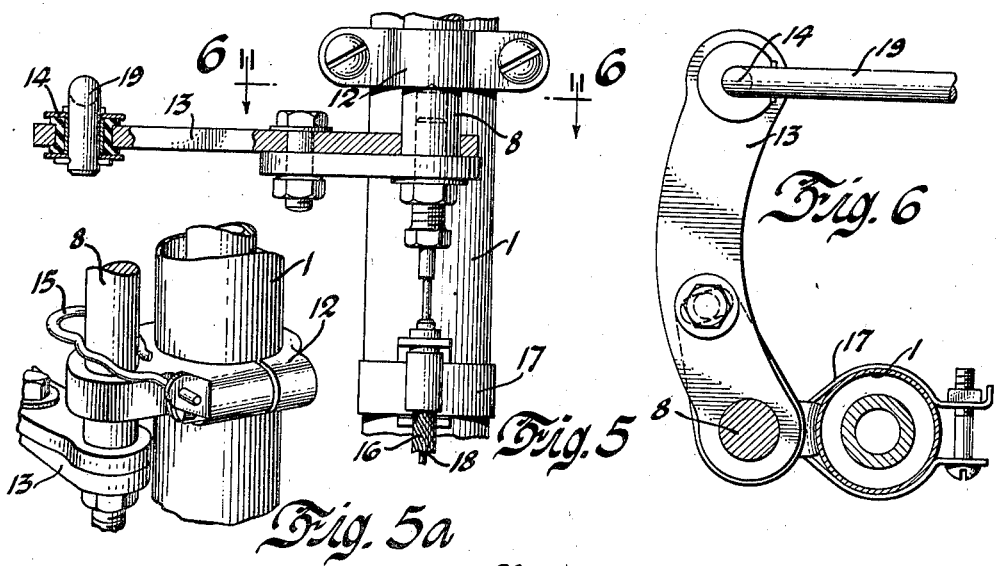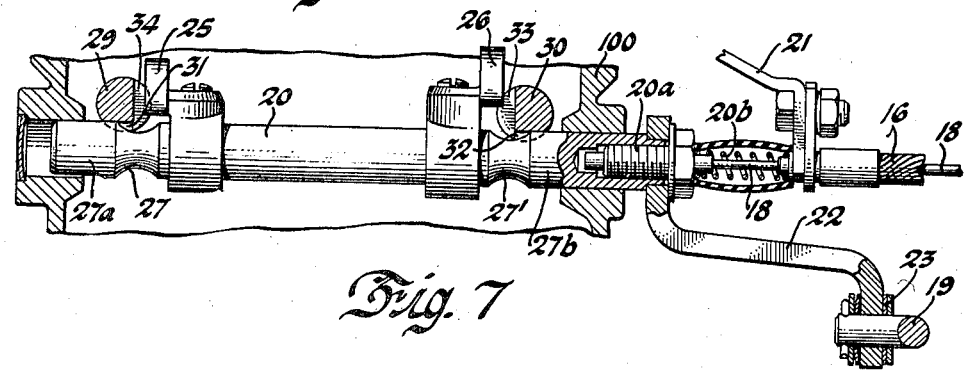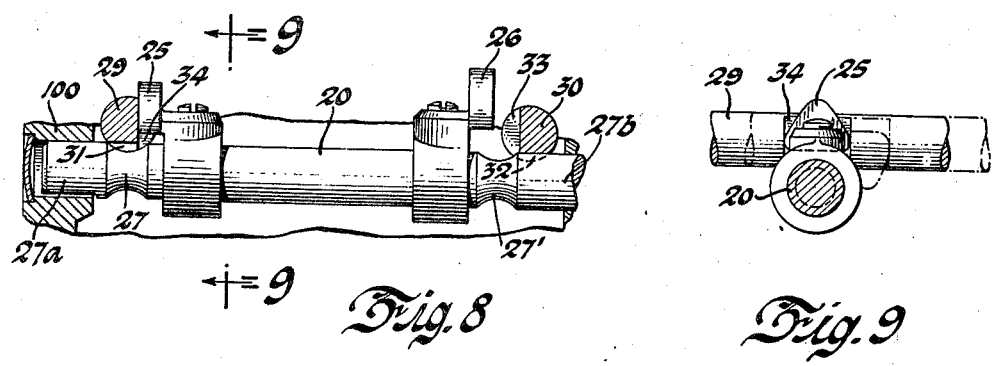

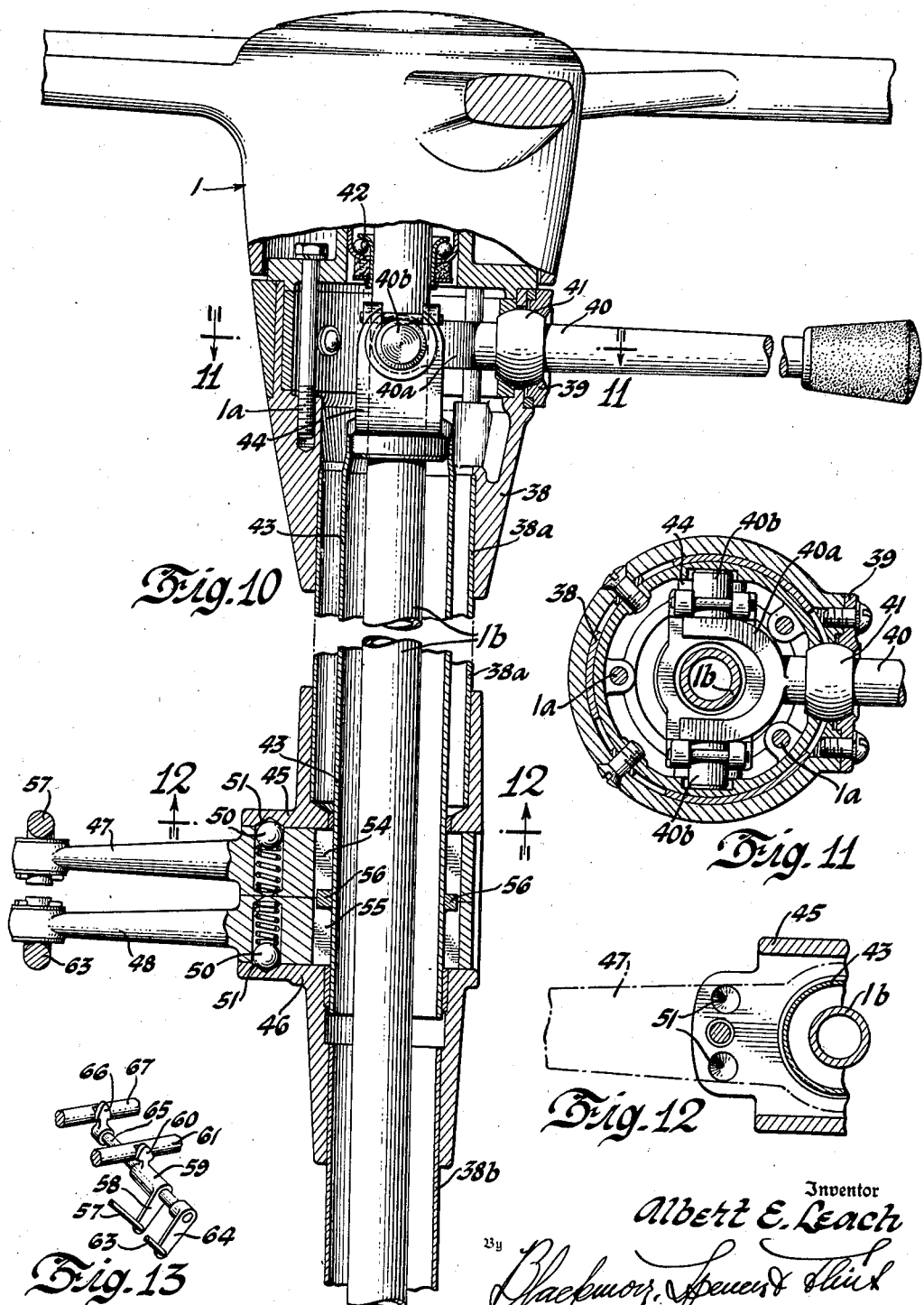

2,334,421

UNITED STATES PATENT OFFICE 2,334,421

TRANSMISSION CONTROL

Albert E. Leach, Royal Oak, Mich., assignor to General Motors Corporation, Detroit, Mich., a corporation of Delaware Application July 11, 1938, Serial No. 218,587

19 Claims. (Cl. 74—484)

The invention relates to remote control apparatus for change speed gearboxes. It relates more particularly to means for shifting the elements of an automobile transmission to effect drive at different step ratios, and it is the object of the invention to provide an improved operating means yielding more convenience and safety than obtainable with control devices now in use.

It is an object of the invention to provide the manual control lever and associated elements with a full interlocking selection and actuation system wherein wrong motion cannot occur, wherein there is a minimum of lost motion and friction loss, and wherein the actions are performed by a small number of moving parts, simply related.

Among other objects, the invention is directed to provide a gear shifting mechanism having a single selector-actuator element movable by hand through angular positions, the hand operated portion of which moves at a uniform distance from a center, whose radius is the effective length of the element; a second selector-actuator element which converts the movement of the first element into sliding and rocking motion, in conjunction with a gearbox having concentric actuation means joined to the second element for converting the rocking motion thereof into gear actuation, and for converting the selective motion thereof into prior selection of the gear shifting means.

The invention provides a reduction in the number of mechanical conversions between the first hand-operated element and the final shifting elements, believed to constitute a contribution to the art, as exemplified by the demonstration, yielding advantages in the low degree of friction loss encountered, over other devices, as will be apparent in the following showing.

A further object is the provision of enclosure of the working parts, including the selector-actuator mechanism, against dirt, dust, and for adequate lubrication.

It is an object of the invention to provide a form of connecting means between the hand operated element and the final shifting element in which exact parallel motion between a primary element and a gear selector and actuator element is achieved; for the elimination of lost motion, for exactness in feel of the parts, and for positiveness of selecting and shifting action.

A modified form demonstrates certain of the features above enumerated.

The present invention is made with full regard for the fact that unitary or single members in remote control of gearboxes are old, and for the fact that sliding and rocking elements in such devices are well known. The unique features herewith are, however, drawn to specific construction forms in which simplification, sureness and absolute prevention of wrong motion are guaranteed.

Various additional objects and advantages of the invention will be made apparent from the following description, reference being made to the accompanying drawings, in which:

Figure 1 is a perspective view of the installation of the invention on a motor vehicle.

Figure 2 is a sectional view of the assembly of parts associated with the operator's control.

Figure 3 is a longitudinal section taken through the operator's control handle, of which Figure 2 is a section taken at 2—2.

Figure 4 shows a sectional detail of the control head of Figure 3 taken at 4—4. Figure 4a is a section at 4a—4a of Figure 3 showing rattle prevention means.

Figure 5 is an elevation view of the assembly of parts at the lower end of the steering column, and Figure 6 is a plan view in the direction of the arrow at 6—6 of Figure 5 of the assembly. Fig. 5a is a detail of Fig. 5.

Figure 7 is a fragmentary section taken transversely in a standard form of present day shifting gearbox in which the shifter rails move with the forks. The connections at the right of Figure 7 are moved by the elements of Figures 5 and 6. The Figure 7 showing of the shifter parts is "neutral," that is, with both shifter rails locked.

Figure 8 is a view similar to Figure 7 of the transmisison selector-actuator shaft, the parts being in a shifted position locking the motion of but one rail while placed for actuation of another rail.

Figure 9 is a longitudinal view along one rail of Figure 8 showing the seating of an actuating means, taken at 9—9 of Figure 8.

Figure 10 is an elevation view, partly in section, of a modification form of the invention wherein the selection and actuation mechanism is completely mounted with the steering column, there being firm link connections with the gearbox elements as described further. Figure 11 is a sectional view of the parts of the control head of Figure 10, taken at 11—11, and Figure 12 is a detail view in part section of the poppet or position affirming means taken on 12—12 of Figure 10.

Figure 13 is a schematic perspective of a typical form of gearbox shifter mechanism, coupled to the leverage system of Figure 10 through rodding, as shown.

In Figure 1 the operator control mechanism is shown as mounted on the vehicle, the fitting 2 being clamped to the vehicle steering column 1 as in Figures 2 and 3. Screw coupling 3 threads into the upper end of fitting 2, and carries pivot pins 4 and 5 on which is fulcrumed hollow lever 6 terminating in knob 7. Shaft 8, supported loosely in fitting 2 for rotation, has bent arm 8a terminating in ball 9 restrained within the hollow lever 6. Stud 10 and spring 10a prevent rattle of loosely mounted shaft 8 in fitting 2.

When the lever 6 is rocked on pins 4—5 in a plane parallel to the centerline of shaft 8, shaft 8 through bent arm 8a is moved longitudinally; and when the lever 6 is rotated, the control shaft 8 turns freely in fitting 2, or rotationally as in Figure 4. It will be noted that the action point 9 is on the same side of the fulcrum S as the knob 7 of lever 6.

The anti-rattle spring 9' is inset in a recess in ball 9, at an angle so that it cannot interfere with the application of vertical force at a—a', or horizontal force at b—b'. This assures even and uniform spring loading for both components.

With respect to the centerline of control element 8, the rotating motion corresponds to gearshift actuation, and the longitudinal or axial motion to gearshift selection, as will be understood from the following description.

The lower end of shaft 8 is supported on the column 1 in bracket 12 for rotation, and is attached to lever 13 equipped with pivot 14 as shown in detail in Figure 6. Bowden wire sleeve 16 is supported in bracket 17 attached to column 1 as in Figure 5, and wire 18 is fixed to shaft 8 to transmit longitudinal motion. Rod 19 attached at 14 reciprocates with lever 13.

The external face of shaft 8 of Figure 5a affords bearing for spring 15 supported by bracket 12. The spring prevents backlash from imparting vibration to shaft 8, likewise preventing handlever 7 of Fig. 3 from vibration originating in rocking or shifting movement of the power plant. The spring 15 is sufficiently strong to dampen vibration, but weak enough to permit deliberate selective hand movements of lever 7 and shaft 8.

Figure 7 shows a portion of the vehicle gearbox in transverse section, shaft 20 projecting externally where adjustable fitting 20a connects it to wire 18, whose sleeve 16 is held by bracket 21 attached conveniently to the gearbox. Crank arm 22, attached to shaft 20 for rocking motion, terminates in pivot 23, where rod 19 connects it with the motion of lever 13 of Figures 5 and 6. Shaft 20 may be termed the selector-actuator element as will be apparent from the following description of its operation. It slides and rotates freely in bosses of casing 100. Biasing spring 20b serves to preload the mechanism 20, 20a, 18 for occupying a left-hand position in Figure 7 such that the shift to rail 29, which may be to second-to-high shifter, is facilitated.

Shaft 20 inside the gearbox casing 100 carries two integral or affixed cams 25 and 26, and is cut away at 27 and 27', the end bosses 27a and 27b serving to block either of rails 29 or 30 when the other is cam actuated. This is accomplished by lateral notches cut in the shifter rails at 31 and 32, so that mechanical interference is assured. The lateral spacing of the cams 25 and 26 and bosses 27a—27b is arranged so that when boss 27a fully blocks rail 29, cam 26 is seated in vertical actuator notch 33 of rail 30; and when boss 27b fully blocks rail 30, cam 25 is seated in vertical notch 34 of rail 29.

When shaft 20 is shifted to the left as in Figure 8, rail 30 is blocked, and rail 29 made active as in Figure 9; when it is shifted to the right, rail 29 is blocked and rail 30 active. This selection action precedes any motion of the mechanism for shifting to a gear engaged position of either of rails 29 or 30, which are connected to sliders or forks in the gearbox, to yield the customary three speeds forward and reverse shift pattern. After the selection action is accomplished, the rocking of shaft 20 permits one of cams 25 or 26 to apply longitudinal actuator shift motion to rails 29 or 30.

The motion of knob end 7 of lever 6 may be thought of as taking place in the surface of a sphere centered at S of Figure 3, in an H-pattern, laid over on the side with the middle bar of the H lying in a plane passing through the centerline of shaft 2.

Before shift to a new gear, the shaft 20 must be rocked back to a position from which selection action is possible, that is, to neutral, the position shown in Figure 7, where the knob 7 lies in the middle bar of the H pattern.

Referring back to Figure 3, vertical motion of lever 6 compels vertical motion of shaft 8, longitudinal motion of Bowden wire 18, and consequent sliding motion of shaft 20, registering one of cams 25 or 26 in notches 33 or 34 respectively, in rails 29 or 30, while blocking that rail not cam connected, through the action of bosses 27a or 27b. In neutral position, neither of the cams are in register with the rail notches, but the spacing of bosses 27a and 27b is such that both rails are blocked.

This prevents shake of the rails accidentally meshing a gear, and compels a positive neutral condition, at which time lever 6 may swing freely vertically, while reciprocating wire 18 in sleeve 16.

Rotational motion of lever 6 is transmitted by shaft 8, lever 13, rod 19, lever 22 to shaft 20 for actuation of gearshift by the rails, the cams 25—26 providing positive shift to and from the gear positions. When either of the cams are rocked into gear-engaging position, the inactive rail is positively blocked.

It should be noted that the axial and rotational motions of elements 8 and 20 are always equivalent and parallel, and exact repetition of the selection and actuation components applied by handlever 6 is compelled. The simplicity of the arrangement with the small number of moving parts assures a minimum of friction loss so that the hand power applied by the leverage of handle 6 is ample to complete all shift actions, even in cold weather, when oil is stiff.

Since the cross-over shift of shaft 20 of Figures 7 and 8 requires very little force, the effort of hand lever 6 is applied thereto with no mechanical advantage beyond the ball joint end 9. The actuation motion of rotation of shaft 8, however, has the mechanical advantage of the full length of lever 6 between pivot S and knob 7, over cams 25 and 26, demultiplied by levers 13 and 22. It is remarked that the rotational motion between shafts 8 and 20, with respect to the axial motion of elements 8—18—20 is inverted, because of the phasing of the crank arms 13 and 22 to their attached shafts.

The ball-contact at 9 delivers the shift force through extremely small touching point areas, and since shaft 8 is freely mounted in fitting 2, except for the force of spring 10a on anti-rattler button 10, the only restraint to selection motion is in the wire sleeve 16, and in the bearing of shaft 20 in the transmission casing 100.

Attention is directed to the fact that lever 6 moves as a radius of a sphere whose center is at S of Figures 2 and 3, providing a smooth transition feel for the vehicle operator. This method of motion conversion is believed unique.

The assembly of controls thus described yields a neat, compact mechanism in which there is a minimum of lost motion and friction. The converting of the two motions of selection and actuation from lever 6 to rocking and sliding motion of shaft 20 with least friction and slack in the system is essential to proper driver feel of the mechanism. The dividing of the two motions through flexible member 18, and through lever 13, rod 19, and lever 22, to shaft 20, provides positive connection wherein the yield through the wire system for selection, permits vibrational rocking of the power plant without binding reaction on the controls. The positive shifting and blocking of the rails through the unitary actions of shaft 8 and shaft 20 in the above combination provides complete freedom from wrong motion in the system, and proper feel by the operator's hand on lever 6, whereby the resistances of the shift action of rails 29 and 30 may be felt at all times. This is important in the prevention of incomplete mesh of the gears in that motor vehicles today are universally equipped with synchronizer devices moved by the gearbox forks or rails, and unless a fully positive shifting and interlocking control is used, the transmission mechanisms become unnecessarily abused, and do not have proper life.

A certain advantage results from the use of flexible member 18 in that present day gearboxes integral with power plants are subject to axial and rotational torque reactions or vibrations. It is apparent that in Figure 1 a predetermined, limited axial and reaction motion of power plant P may occur without disturbing the operation or setting of the selection controls. Furthermore in the actuation linkage between shafts 8 and 20, lever 13, rod 19 and lever 22, the pivot bushings at 14 and 23 are both shown as made of yielding material as indicated at 14 in Figure 5, to prevent binding of the parts. In these ways the free motion of the control elements is assured at all times.

The arrangement of Figures 10, 11, 12 and 13 is an alternative construction to that of Figures 1 to 9 inclusive.

Fitting 38 attached to the top of the steering column 1 by studs 1a carries rotatable sleeve 39 providing a pivot for ball 41 of handlever 40. The steering shaft 1b is supported in fitting 38 by bearing 42 and passes through hollow shaft 43 attached to yoke 44. Lever 40 is formed into horizontal fork 40a carrying pivot pins 40b, which penetrate bearing recesses in vertical yoke 44.

Vertical motion of handlever 40 results in longitudinal movement of yoke 44 and shaft 43, fulcruming at 39; and rotational motion of the lever 40 as in Figure 11 carries the sleeve 39 and shaft 43 with it.

At the lower end of column 1, flanges 45 and 46 restrain the two shift levers 47 and 48, but permit rotation between positions determined by poppets 50 and notches 51 of flanges 45—46.

The inner portions of the eyes of levers 47—48 are slotted out to form vertical keyways at 54 and 55. Keys 56 project from the lower end of shaft radially into the keyways, the keys 56 being integral with, or fastened to shaft 43.

When lever 40 is rocked vertically, shaft 43 slides vertically, the keys 56 passing into exclusive intersection with one or another of slots 54 or 55 of lever 47 or 48 respectively.

Subsequent motion of lever 40 rotationally then rocks one of levers 47 or 48, while leaving the other locked against motion by the action of poppets 50 in notches 51 shown in Figure 12.

As shown in Figure 10 and in Figure 13, lever 47 is joined to rod 57 pivoted to lever 58, attached to hollow shaft 59 entering the gearbox, and carrying cam 60 intersecting rail 61 for leftward motion of lever 58 and rightward motion of rail 61 adapted to shift gears to direct. When the lever 47 puts rod 57 in tension, lever 58, shaft 59, and cam 60 rock clockwise, shifting rail 61 to engage the second speed gear.

When key 56 of Figure 10 enters slot 55 of lever 48 and lever 40 is rotated, shaft 43 transmits rocking motion to lever 48 through key 56 and slot 55; rod 63 reciprocating lever 64, solid shaft 65 and cam 66 to shift rail 67 to reverse or low speed ratios, similar to rail 29 of Figure 7.

The enclosure of the working parts in separate tube 38a attached to fitting 38 and flanges 45—46, the lower tube 38b being the extension, is believed to be advantageous in sealing dirt and dust away from the mechanism.

Among the many advantages arising from the use of my improved construction, is that the front compartment space is cleared of gearlever interference, making it convenient to have two passengers ride in the front seat.

Changes may be made in the appearance, arrangement, construction and combination of parts of my improved device without departing from the spirit of my invention, and it is my intention to cover by my claims such changes as may be reasonably included in the scope thereof.

I claim as my invention:

1. In a gearing control having a manual control member and shift actuating members, means for selectively operating the shift actuating members from the control member with a positive feel to the hand of the operator of the motion of the shift actuating members, said means comprising a shaft mounted for both rotational and translatory movements selectively effected by said control member, a shaft for operating the shift actuating members, and connecting means including a flexible element directly connecting said shafts so as to transmit identical translatory motion therebetween, and a separate mechanical connection for transmitting the identical rotational motion of the first-named shaft to the second-named shaft, whereby the latter shaft repeats both rotational and translatory motion of the first-named shaft.

2. In motor vehicles, a change speed gearbox, a hand lever having a knob arranged for rocking motion in two directions, a gearshift control shaft adapted to move along its axis and rotationally, a selector-actuator shaft mounted in said gearbox for axial and rotational motion, mechanical means linking said lever and control shaft operative to convert one motion of the lever into axial, and the other motion of the lever into rotational motion of the said control shaft, the motion of said knob of said lever always occurring in the same direction as the motion of said control shaft, and connecting means between the shafts effective to enforce identical axial and rocking motion therebetween with motion of said lever, whereby the motion of said selector-actuator shaft duplicates the motion of said control shaft.

3. In gearing controls, a manual control member, a primary control shaft moved rotationally and longitudinally by said member, a selective step-ratio gearbox having a secondary shaft mounted therein for selective sliding and rotational actuation motion identical with the motion of said primary shaft, flexible means uninterruptedly connecting said shafts so as to transmit identical longitudinal selection motion only from said primary shaft to said secondary shaft and thereby to provide positive feel to the hand of the operator of the motion of said connecting shaft, and mechanical linkage likewise joining the shafts for transmitting identical rotational motion only of gear actuation from said primary shaft to said secondary shaft.

4. In change speed gearboxes having sliding members for selection and actuation of step ratio drive, a control element mounted for longitudinal motion along and rocking motion about its centerline, a manual lever adapted to move always radially about a center coinciding with the aforementioned centerline, joining means between said element and said lever arranged to convert the motion of the said lever into longitudinal and rocking motion of said element, a change speed gearbox, a second element in said gearbox effective to select the ratio thereof by sliding motion and actuate the gearing thereof by rocking motion, and connecting means between said elements operative to transmit the longitudinal movement of the first to identical longitudinal movement of the second for gear selection, and operative to transmit the rocking motion of the first to duplicate movement of the second said element for gear actuation.

5. In a vehicle having a steering column, and a step ratio gearing, a handlever mounted on said column for two-directional motion, the operator end of the lever moving in the surface of a sphere, a control element mounted on said column having a centerline of motion always coincident with the center of motion of said lever, and movable longitudinally and rotationally thereby, a second element adapted to duplicate the movement of said first element, effective to select and actuate said gearing, and means joining said elements operative to transmit the longitudinal motion from the first to the second for selection, and operative to transmit an identical rotational motion from the first to the second of said elements for actuation of said gearing.

6. In gearing controls, a vehicle steering column, a parallel shaft mounted on said column for rotational and longitudinal motion including a bent arm having a ball joint end, a manual handle engaging said ball joint end and thereby adapted to rock and slide said shaft with respect to said column between vertical and lateral positions by force applied through said ball joint, a step ratio gearbox including a selector and actuator shaft operative longitudinally for prevention of motion and selection, and rotationally for gear actuation; a lever attached to said first named shaft, a lever attached to said second named shaft, a reciprocable rod pivoted to both said levers for transmitting gear actuation force therebetween, and a flexible member joining the shafts adapted to transmit selection motion from sliding of the first named shaft to duplicate sliding motion of said second named shaft.

7. In gearing controls, a step-ratio gearbox having a plurality of gear-changing members and including a selection and actuation shaft movable to neutral and to gear-engaging positions, a manually operated shaft, and connections between said shafts such that identical rotation and translation of said second-named shaft is repeated by said first-named shaft, said connections comprising a flexible means for transmitting uninterrupted selective longitudinal motion only from the second-named shaft to the first-named shaft and for transmitting through the second-named shaft positive feel to the operator of such longitudinal motion of the first-named shaft, said means being fixed to said shafts, and said connections also comprising a separate mechanical linkage for transmitting actuating rotational motion only from said manually operated shaft to said selection and actuation shaft.

8. In gearing controls, a step ratio gearbox, gearshifting members adapted to slide longitudinally of said gearbox, and having cam slots and notches for actuation and movement prevention respectively, a selection and actuation shaft having cams and stops, said shaft being mounted in said gearbox and arranged to slide transversely for registering said cams with said slots and said stops with said notches, a manually operable control shaft adapted to move rotationally and longitudinally between limiting positions, said control shaft having a bent arm terminating in a ball, connecting means between said shafts effective to transmit duplicate longitudinal and rotational motion from said control shaft to said selection and actuation shaft, and a pivoted manual lever arranged to slide and rotate said control shaft by shifting said ball in either of two planes of motion of said manual lever.

9. In controls for variable speed ratio selective gearing, a vehicle framing having a unitary power plant suspended therein for relative motion thereto and comprising an engine and a gearbox assembly, a primary control shaft for said gearbox mounted on said framing and subject to manual operation by an operator for longitudinal gear selection motion and for rotational gear actuation motion, a secondary shaft mounted in said gearbox, and yielding connecting means between said shafts for moving longitudinally and rotationally said secondary shaft identically with said primary shaft when longitudinal gear selection and rotational gear actuation motion is imparted to the latter by the operator during periods of such relative motion between said power plant and said framing, said yielding means including a flexible element directly and uninterruptedly connecting said shafts for transmitting gear selection motion to said secondary shaft and for transmitting through said primary shaft a positive feel to the hand of the operator of the gear selection motion of said secondary shaft and said yielding means also including mechanism, other than said element, flexibly connecting said shafts for transmitting gear actuation motion to said secondary shaft.

10. In combination, motor vehicle framing, a power plant mounted therein for relative movement and including a variable speed gearbox having ratio shifting members, a selector and actuator shaft in said gearbox for moving said members, a handlever adapted to select and actuate the shifting members of said gearbox, a control shaft mounted on said framing slidable and rotatable by said handlever and adapted to be connected to said first-named shaft, connecting means joining said shafts for identical repeated motion of said first-named shaft in response to motion applied to said control shaft by said handlever, said connecting means comprising gear selecting means including Bowden wire mechanism and gear shifting linkage including yielding connections adapted to permit limited relative motion between the said shafts such as induced by relative movement between said power plant and said framing without displacement of either of said shafts, and restraining means for at least one motion of said control shaft effective to dampen vibrations transmitted through said connecting means.

11. In a motor vehicle, an engine, a final drive, a vehicle steering column, a step-ratio gearbox connecting said engine to said final drive, a shifter mechanism in said gearbox, an operator control for said gearbox supported by said column and adapted to move in a plane intersecting the centerline of said column and to rotate about a centerline parallel to said column, a rotating and sliding shaft supported by said column adapted to repeat the motions of said control, the said shaft being connected to said control through a bent arm fulcrumed to said control, and connecting means between said shaft and gearbox effective to transmit said rotary and said sliding motions separately to said mechanism for establishing selected step-ratios in said gearbox according to the motions imparted to said operator control.

12. In motor vehicle controls, a power plant having a gearbox mechanism including a shift selection and control shaft arranged transversely to the centerline of said power plant, a vehicle steering column, a control head construction mounted on said steering column comprising a control shaft arranged to rotate and slide parallel with said column and a handle linked with said control shaft for compelling coincident rotational and sliding motion thereof in the same direction of movement applied to said handle, a flexible connecting means attached to said first and said second shafts for transmitting equal axial motion in the same direction therebetween, and independently operable linkage means connecting said shafts for converting equal rotary motion therebetween, both of said means being adapted to transmit positive gear selection and actuation settings applied to said handle, while yielding to torque impulses and vibrations of said power plant.

13. In a combination such as described in claim 11, the sub-combination of damping means effective upon said operator control for absorption of force derived from motion of said gearbox.

14. In a combination such as described in claim 11, the sub-combination of means embodied in said shifter mechanism operative to limit the rotation and reciprocating motions of said shaft and said control to predetermined effective gear settings of said gearbox.

15. In a combination such as described in claim 1, the sub-combination of yielding devices incorporated in said connecting means for absorption of vibration originating in said gearbox.

16. In a combination such as described in claim 3, the sub-combination of damping means coacting with said primary shaft, effective to absorb longitudinal forces derived from vibration of said gearbox.

17. In a combination such as described in claim 5, the sub-combination of a stop system for the movement of said second element effective to limit both of the motions of said handlever, through the joining means connecting the said first and second elements.

18. In speed ratio controls for power transmissions, a motor vehicle, a transmission ratio selecting and actuating lever supported for rocking and rotational motion in said vehicle, a control shaft adapted to be rotated by parallel rotation of said lever and to be translated axially by motion in the same direction of said lever, a gearbox mounted in said vehicle capable of relative torsional movement with respect to the framing of said vehicle, a steering column supported on the framing of said vehicle and supporting the said control shaft, an actuator shaft mounted in said gearbox and adapted to select one of said rails by axial movement while locking the other of said rails from motion to a gear actuation position, and adapted to actuate one of said rails by rotational motion about its own axis while retaining the said other rail in locked, inactive position; and a plurality of connections including means joining said shafts adapted to transmit axial and rocking force and motion in identical directions therebetween while permitting limited yielding of said connections in accordance with torsional movement of said gearbox.

19. In gearing controls, a manual control member, a primary control shaft moved by said member rotationally and longitudinally, a selective speed ratio gearbox, a secondary shaft mounted in said gearbox for selective sliding and rotative actuation identical with the motion of said first-named shaft, means arranged to transmit identical longitudinal selection motion only from said first-named shaft to said second-named shaft and capable of limited yielding, mechanical linkage independently joining said shafts for transmitting identical and rotational motion only of gear actuation between said shafts, likewise capable of limited yielding, and interlock means in said gearbox to limit the motions of said secondary shaft likewise effective to limit the motions of said first-named control shaft through the agency of said selection motion transmitting means and said rotational motion transmitting linkage.

ALBERT E. LEACH.